United States Patent [19]

Bohg et al.

[11] 4,309,985
[45] Jan. 12, 1982

[54] SOLAR COLLECTOR WITH LENS ARRAY

[75] Inventors: Armin Bohg, Neuweiler; Marian Briska, Boeblingen, both of Fed. Rep. of Germany

[73] Assignee: International Business Machines Corporation, Armonk, N.Y.

[21] Appl. No.: 224,585

[22] Filed: Jan. 12, 1981

Related U.S. Application Data

[62] Division of Ser. No. 59,017, Jul. 19, 1979, Pat. No. 4,267,823.

[30] Foreign Application Priority Data

Sep. 29, 1978 [DE] Fed. Rep. of Germany ....... 2842400

[51] Int. Cl.³ .............................................. F24J 3/02
[52] U.S. Cl. .................... 126/422; 126/440; 126/441
[58] Field of Search ............... 126/417, 419, 422, 440, 126/441, 438, 439, 450

[56] References Cited

U.S. PATENT DOCUMENTS

| | | | |
|---|---|---|---|
| 2,030,350 | 2/1936 | Bremser | 126/419 |
| 2,595,905 | 5/1952 | Telkes | 126/419 |
| 2,888,007 | 5/1959 | Tabor | 126/441 |
| 2,969,918 | 1/1961 | Phelps | 126/417 |
| 3,981,293 | 9/1976 | Gillery | 126/441 |
| 3,981,295 | 9/1976 | Minnick | 126/440 |
| 4,064,867 | 12/1977 | Schlesinger | 126/437 |
| 4,137,899 | 2/1979 | Weslow | 126/441 |
| 4,188,941 | 2/1980 | Hopkins | 126/449 |

OTHER PUBLICATIONS

Bohg & Briska, Solar Energy Collector, 12–1976, IBM Technical Disclosure Bulletin vol. 19, No. 7.

*Primary Examiner*—Daniel J. O'Connor
*Attorney, Agent, or Firm*—Alvin J. Riddles

[57] ABSTRACT

A solar collector having a lens array serving as a light incidence surface that focuses the light energy onto radiation passages in a coating located in the focal plane of the lens array, the coating having a radiation reflecting surface on the side away from the incident light and the radiation passages being enabled through energy that is locally effective through focusing of impinging light.

2 Claims, 9 Drawing Figures

SOLAR COLLECTOR WITH LENS ARRAY

This application is a division of application Ser. No. 059,017 filed July 19, 1979, now U.S. Pat. No. 4,267,823.

DESCRIPTION

1. Technical Field

The invention relates to a solar collector for focusing sun radiation.

For increasing the efficiency of solar collectors, two basic demands have to be satisfied, i.e., to make sure that if possible the entire range of the collected beams is used and that radiation reflection is excluded, that the utilization of the radiation is rendered independent of the position of the sun. For meeting the first demand there exist many solutions. The arrangement according to the publication, "Solar Energy Collector" in IBM Technical Disclosure Bulletin, Vol. 19, No. 7, December 1976, on pages 2581 and 2582, to give an example, shows a solar collector which for a radiation incident perpendicularly thereto acts, at least partly, as a black body. By means of a lens array the collected solar radiation is focused onto the apertures of an aperture array associated with the lens array, said aperture array having a reflecting back. By this reflecting side, the radiation reaching the absorber through these apertures is backscattered onto the absorber, after having been scattered thereon. In a vertical radiation incidence, practically all energy is absorbed but depending on a more or less important angular deviation of the position of the sun, such a solar collector is no longer effective since then the foci are outside the apertures of the aperture array. In order to compensate this disadvantage such a solar collector would have to track the position of the sun. However, this is not the only disadvantage of such a solar collector. If, e.g., lens array and aperture array, as generally, consist of different material, their different coefficient of expansion and other environment-dependent characteristics can cause faulty congruence between both raster arrangement which may lead to disturbing decentration.

2. Background Art

In order to avoid such disturbances, certain technical steps are required, as described in German Offenlegungsschrift No. 26 49 886, where the individual lenses of the lens array are made of individual components which, in addition, contain the respective allocated aperture.

On the other hand, a solar collector has become known from German Offenlegungsschrift No. 26 31 412 where it is not necessary to execute a tracking movement of the entire solar collector; there, mechanical controls are provided which permit the positioning of the lenses as a function of the position of the sun. However, the invention does not comprise an automatic tracking of the position of the sun; this positioning has to be done manually or, as specified in German Offenlegungsschrift No. 25 11 740, by means of a time control for approximately ensuring the nominal position of the radiation-collecting elements. A master control directly ruled by sun radiation can execute the precise positioning of the angular position.

It can, therefore, be concluded that an ideal solar collector should have an automatic sun tracking device, also because of the seasonal adjustment and that, as specified in German Auslegungsschrift No. 25 45 224, selectively reflecting layers are associated with the absorber in such a manner that the solar radiation is sufficiently absorbed, and that long-wave infrared, on the other hand, is only slightly re-emitted. The above specified arrangements, however, do not simultaneously satisfy all these demands, mainly because the tracking for the purpose of collecting the radiation independently of the respective sun position requires on the one hand complicated control mechanisms and can on the other be automatically realized under certain conditions only.

It is, therefore, the object of the invention to provide a solar collector which automatically tracks the respective position of the sun in a manner sufficing for practical application, said collector acting also as a black body.

This object is achieved according to the invention, as specified, by providing a structure where the radiation passages are enabled by the focused light energy.

There exist several possibilities of providing free light passages, owing to the focusing energy, in a layer having a reflecting back. An arrangement preferred in accordance with the invention provides that the radiation passages are enabled in a scale coating provided in the focal plane and composed of individual bimetallic scales that are bendable under the influence of radiation focused thereon, said scale coating provided in the focal plane of light-focusing components and arranged on a dielectric substrate is is known per se from IBM Technical Disclosure Bulletin, Vol. 13, No. 3, August 1970, pages 603 and 604, but contrary to that invention the metallic scales there can be bent under the influence of Coulomb forces so that light focused thereon is reflected at respective different angles, depending on whether or not the respective metallic scale involved is bent.

Since bimetallic scales can easily be made in minimum size, an advantageous development of the invention provides that the dimensions of the bimetallic scales are selected in such a manner that a number in the order of 100 bimetallic scales are allocated to each lens of the lens array.

For simplifying production, it would be advisable to provide the scale coating on a substrate which also forms the lens array plate so that the refractive index and lens radius for providing the necessary focal plane are thus advantageously adapted to each other.

In order to avoid an unnecessary heating of the bimetallic scale coating in operation, it can, on the other hand, also be quite advantageous for design reasons to provide a space between substrate and lens array, and to direct through that space, a cooling medium which can be either a gas or another fluid, depending on the kind of solar collector operation. In that case, however, the refractive indices of substrate, lens array plate and cooling medium should correspond, if possible.

According to another aspect of the invention, the bimetallic scale coating contains as bimetallic scales relatively short copper lamellae and relatively long aluminum lamellae provided by means of welding or soldering on several aluminum strips vapor-deposited process taking place by means of conventional mask processes. Equally arranged aluminum strips are vapor-deposited on a glass substrate. Both groups of aluminum strips are connected at their ends to transversal aluminum strips which, when the synthetic material support is superimposed with the glass substrate in such a manner that the aluminum strips are placed one over the other, are used as current connectors in insulation from each other, for the subsequent welding of the aluminum strips superimposed upon each other, and for their simultaneous pressing together. This electric welding is thus performed under the influence of pressure in that, e.g., a roller is moved over the synthetic material substrate transversely to the aluminum strips so that the strips are welded to each other point-by-point. Subsequently, the synthetic material support is removed by means of an organic solvent.

The method as disclosed by the invention can be modified in such a manner that prior to the removal of the synthetic material support, the aluminum strips of the synthetic material support are welded to those of the glass substrate by means of a laser beam welding process as described for some other purpose in German Offenlegungsschrift No. 21 39 850.

BRIEF DESCRIPTION OF THE DRAWINGS

Below, the invention will be described in detail with an embodiment and referring to the drawings which show the following.

DISCLOSURE OF THE INVENTION

Figure 1:
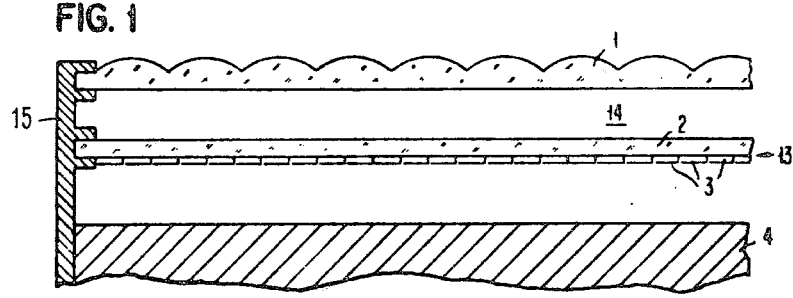
FIG. 1 is a section not true-to-scale of a cross-section through a solar collector designed in accordance with the invention.

The arrangement according to the invention as schematically and section-wise shown in FIG. 1 shows in a presentation that is not true-to-scale, a solar collector containing a lens array plate 1 having in its focal plane a bimetallic scale coating 13 arranged at a predetermined distance from absorber 4. At the edges, the individual components are fixed by frame 15 in a known manner, as shown in FIG. 1. Additionally to frame 15, spacer rods can be provided in the middle if the size of the solar collector should require it. Bimetallic scale coating 13 consists of the individual bimetallic scales 3 which at their ends are arranged over aluminum strips 10, 11 extending longitudinally thereto at substrate 2. However, substrate 2 can also form a unit with lens array plate 1, refractive index as well as the spacing of the lamps array to scale coating 13 being selected in such a manner that the focusing conditions of bimetallic scale coating 13 in the focal plane are maintained. The spacing of bimetallic scale coating 13 to absorber 4, with the surface of bimetallic scale coating 13 facing absorber 4 being totally reflecting, is not critical but selected in such a manner that heat conduction does not cause an important heating of bimetallic scale coating 13 together with substrate 2. It is obvious that the inner faces of frame 15 are radiation-reflecting, too. While the space between absorber 4 and bimetallic scale coating 13 should preferably be airtight, it can be advisable to keep space 14 between bimetallic scale coating 13 and lens array plate 1 open for a gas stream, e.g., air for cooling purposes, or to let a cooling fluid pass through it. For avoiding reflection losses such a cooling medium should have the same refractive index as lens array plate 1 and substrate 2. Such measures are advantageous particularly in those cases where excessive heating of the bimetallic scale coating is to be expected, as e.g., when used in hot zones, for there could be an unintended bending of bimetallic scales that are not involved.

Figure 2:
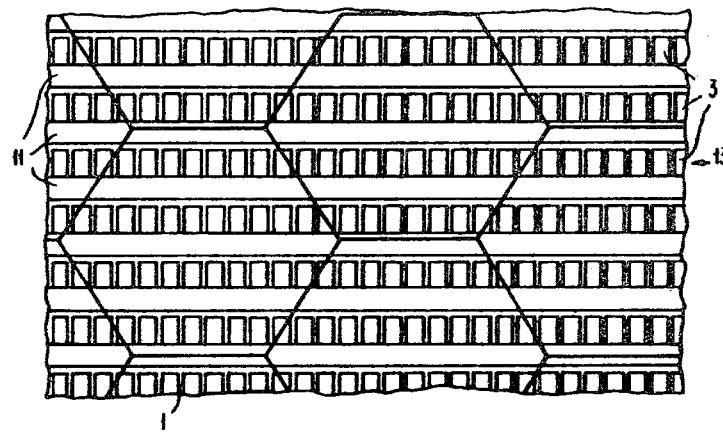
FIG. 2 is the section of a plan view of a solar collector in accordance with the invention.

In the plan view section in accordance with FIG. 2, the hexagonal pattern of the lens array is clearly visible, as well as bimetallic scale coating 13 with aluminum strips 11 for fixing bimetallic scales 3 on substrate 2, not visible here. This drawing which is not true-to-scale either, shows that one respective lens of lens array plate 1 has a multitude of bimetallic scales allocated thereto. In practical use, one respective lens has a number on the order of 100 bimetallic scales 3 allocated thereto. Bimetallic scales 3 themselves consist of aluminum layers which are approximately 2 mm long and 0.5 mm wide, and which are directly fixed on aluminum strip 11; onto these aluminum layers, copper layers of the same width but of a length of 0.5 mm are applied so that correspondingly fixed bimetallic scales 3 are obtained. In the system of bimetallic scale coating 13, bimetallic scales 3 are arranged as closely adjacent as possible in such a manner that the free ends of bimetallic scales 3 can be bent under the influence of radiation without disturbing each other. On the other hand, however, the scale spacings are so small that there is no important reflection loss for the radiation backscattered by absorber 4 so that there is practically a homogeneous reflection surface of bimetallic scale coating 13.

The lenses of lens array plate 1 with a respective diameter of approximately 20 cm are selected with respect to their above-mentioned characteristics in such a manner that the respective sun imaging is approximately 2 mm in the focus. The lenses themselves can also be designed as Fresnel lenses.

Absorber 4 consists in a known manner of a frosted black body containing pipes through which water is passing. It is, of course, also possible to use other designs of absorber 4, as well as heat transport media other than water.

For operating the solar collector as disclosed by the invention, it is aligned with respect to the highest position of the sun in such a manner that a maximum angular range of the incident radiation is collected. At any rate, the interceptable angular range, with the solar collector according to the invention, being aligned perpendicularly to the altitude of the sun, lies between 90° and 180°, so that for practical application a tracking of the solar altitude is not necessary. The solar altitudes of interest are in maximum between 8 and 16 hours local time in the summer so that the angular range involved would be approximately 120° which for the application of the arrangement as disclosed by the invention is covered quite easily.

Figure 3:
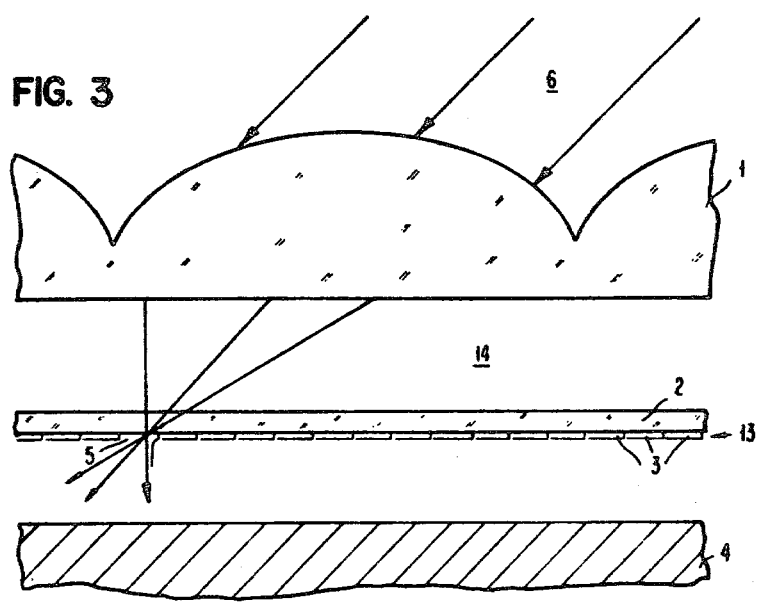
FIG. 3 is an enlarged section out of a cross-section of a solar collector in accordance with the invention, with a beam focusing to indicate the bending of a bimetallic scale.

The operation of the solar collector as disclosed by the invention is shown quite clearly in FIG. 3. It is a known fact that the locus of the focus of a lens depends on the angle of incidence of radiation 6 directed thereon, i.e., the focus shifts in the focal plane of this lens. If now, as in the present invention a bimetallic scale coating 13 is arranged in this focal plane, the heat generated in the respective focus by the incident radiation 6 is fully sufficient for bending the respective bimetallic scale 3 away from substrate 2 in such a manner that a light passage 5 to absorber 4 is enabled. If now the incident radiation 6 migrates as a function of the position of the sun, the invention ensures that at each respective focus a radiation passage 5 is enabled. A certain angular range is blocked for the free passage of radiation when bimetallic scale 3 is bent away from substrate 2, but the bimetallic characteristics can be selected in such a manner that the respective bimetallic strip can be bent to such an extent that the angular range not effective for the passing of the radiation can be kept at a minimum of approximately 30°.

As pointed out above, an important factor for the function of the solar collector as disclosed by the invention consists in that the space between bimetallic scale coating 13 and absorber 4 is airtight, which is ensured by suitably designing frame 15 in FIG. 1. As pointed out previously, it can be quite advisable for various uses to reserve the space between substrate 2 carrying bimetallic scale coating 13, and lens array plate 1 for a cooling medium. Furthermore, by means of suitable manufacturing processes, particularly by applying bimetallic scales 3 at a higher temperature, the properties of these scales can be adapted in such a manner that they can open advantageously only at a threshold temperature of, e.g., 100° C.

For determining the enabling of radiation passages 5 at maximum bending of bimetallic scales 3 the calculation of the radius of curvature is assumed to be of interest.

For the maximum curvature of a bimetallic strip there applies the following relation:

$$s_1/s_2 = \sqrt{E_2}/\sqrt{E_1}$$

$s_1$ and $s_2$ representing respectively the layer thicknesses of the individual metals.

$E_1$ and $E_2$ representing the respective elasticity modules.

If the condition of the above given relation is satisfied there applies the following equation for the radius of curvature of the bimetallic strip:

$$r = 2(s_1+s_2)/3 \, (\alpha_1+\alpha_2) \, \Delta T$$

with $\alpha_1$, $\alpha_2$ representing the linear thermic coefficient of expansion $\Delta T$ the temperature difference.

If for the application as disclosed by the invention a 1.3 $\mu$m thick aluminum part and a 1.0 $\mu$m thick copper part of the bimetallic strip are assumed, there appears for the sum $s_1+s_2$ a value of 2.3 $\mu$m for the use for $s_2$, i.e., the layer thickness of copper, a quotient of 1.3 which furthermore correspond to the root of the quotient of the elasticity modules of copper and aluminum.

Furthermore, there applies for the difference of the linear thermic coefficient of expansion:

$$\alpha_1-\alpha_2 = (24-16) \, 10^{-6}/°C.$$

If in the focus of a respective lens of lens array plate 1 a minimum temperature of 320° C. is assumed, the following applies:

$$T = 320° C. - 20° C. = 300° C.$$

If the above values are used in the given equation for the minimum radius of curvature of a bimetallic scale 3 there applies:

$$r = 2 \times 2.3/3 \times 10^{-6} \times 300 = 6.4 \times 10^2 \, \mu m = 0.64 \, mm.$$

Such a radius of curvature is fully sufficient with a scale length of 1 mm to provide a solar collector without sun tracking for practical use in the given angular range.

Figure 4:
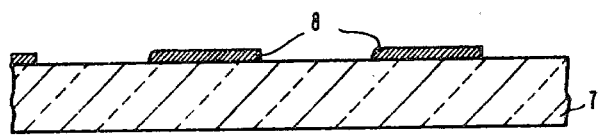
FIGS. 4 to 8 are cross-sections in a sectional view explaining the process of making a solar collector in accordance with the invention.
Figure 5:
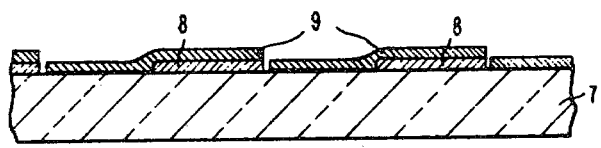

There exist various possibilities of providing a solar collector in accordance with the invention. By means of FIG. 4 to FIG. 8, however, the particularly advantageous manufacturing process will be given by specifying the individual process steps. For that purpose, in accordance with FIG. 4, a regular pattern consisting of copper layers 0.5 mm wide and 1.3 $\mu$m thick and 0.5 mm long is applied on a flexible synthetic material support 7 by means of known processes via a silk screen. These copper layers show in their longitudinal extension, a mutual spacing of approximately 1.5 mm, and in their broad extension a spacing on the order of 10 $\mu$m, as corresponding later to the spacing of bimetallic scales 3. The thus vapor-deposited synthetic material support 7 then shows on its surface copper strips of 0.5 mm width which are composed of individual, closely adjacent copper layers of the respective dimensions of 0.5 mm ·0.55 mm with a mutual spacing of 1.5 mm, approximately.

With a corresponding silk screen aluminum layers 9 are then vapor-deposited over these copper layers 8 (FIG. 5) in such a manner that copper layers 8 are covered in that the three respective edges of both layers 8, 9 are in alignment with each other. The spacing between the individual aluminum layers vapor-deposited in a thickness of approximately 1 $\mu$m correspond to the bimetallic scale spacing of bimetallic scale coating 13, i.e., the aluminum layers also show a width of 0.5 mm but a length of 2 mm. According to FIG. 6, continuous aluminum strips 10 being 20 $\mu$m thick and 0.2 mm wide are vapor-deposited on the thick ends of bimetallic scales 3 in such a manner that the lateral edges of aluminum strips 10 are in alignment with the broad sides of bimetallic scales 3. Thus, a synthetic material support 7 covered with bimetallic scales 3 of copper layers 8 and aluminum layers 9 and forming bimetallic scale coating 13 is obtained which furthermore transversely to the longitudinal direction of bimetallic scales 3 carries continuous aluminum strips 10.

Figure 6:
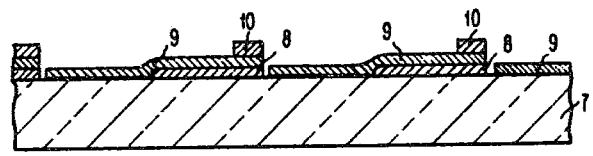
Figure 7:
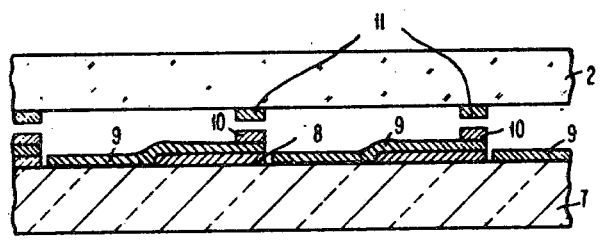
Figure 9:
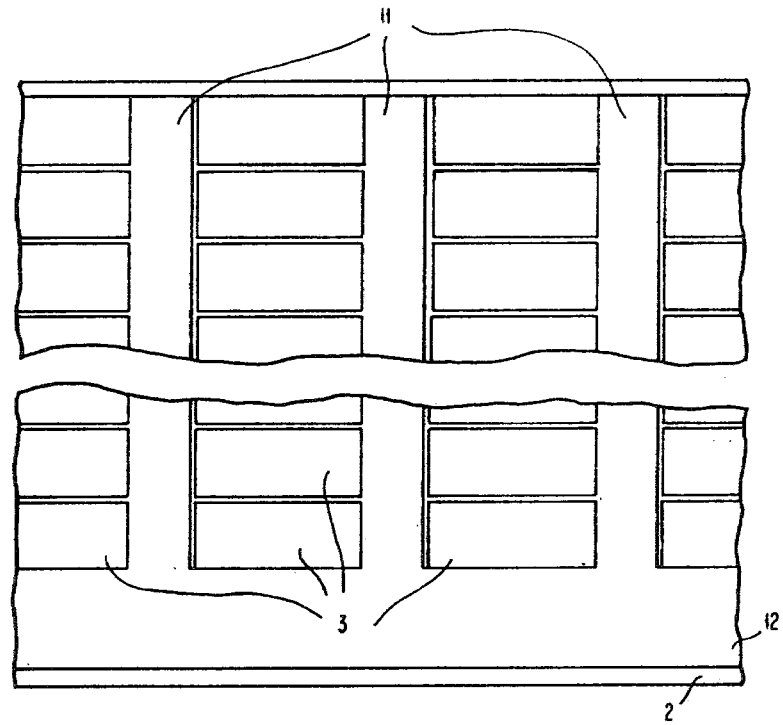
FIG. 9 is a strongly enlarged section not true-to-scale of the solar collector part according to the invention.

In a separate process step equally continuous aluminum strips 11 are vapor-deposited on a glass plate serving as substrate 2, or on the back of a respectively designed lens array plate 1, said aluminum strips, as shown in FIG. 7, showing the same spacing as aluminum strips 10 in the cross-section according to FIG. 6. As furthermore shown by FIG. 9, these aluminum strips 11 on substrate 2 show at one end a transversal aluminum strip 12 so that they are electrically interconnected. The same applies for aluminum strips 10 on synthetic material support 7 which are equally interconnected via a transversal strip not shown here. According to FIG. 7, both components are subsequently placed one over the other in such a manner that aluminum strips 10 and 11 are congruent, with respective alignment steps being made. While aluminum strips 10 and 11 are thus brought into contact it is also made sure that transversal strip 12 on substrate 2 and the corresponding transversal strip on synthetic material support 7 are insulated from each other.

Figure 8:
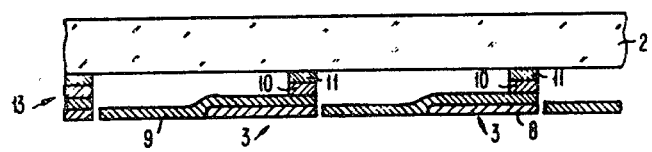

Both transversal strips are connected to a suitable current source so that through being stepwise pressed together aluminum strips 10 and 11 can be welded to each other in the area of bimetallic scales 3. The best way of pressing together both aluminum strips is by exerting pressure by means of a pressure roller moved over synthetic material support 7 transversely to aluminum strips 10 and 11. Synthetic material support 7 is subsequently removed from bimetallic scales 3 by means of an organic solvent so that, as shown in FIG. 8, a substrate 2 is obtained that carries bimetallic scale coating 13 consisting of the individual bimetallic scales 3.

Another way of welding together both aluminum strips 10 and 11 consists of using a pulse-controlled laser spot welding method prior to the removal of synthetic material support 7, said method ensuring flawless welds substantially avoiding negative effects and requiring a minimum of energy, and without having to expose the aluminum strips to high temperatures. Standard laser welding systems can be used for that purpose.

The thus made substrate 2 carrying bimetallic scale coating 13 can, as shown in FIG. 1, be assembled with an absorber 4 and a lens array plate 1 into an advantageously operating solar collector.

It can quite generally be stated with respect to the arrangement as disclosed by the invention that the size of the lenses in lens array plate 1 should be selected in such a manner that advantageously their foci are not smaller than the respective bimetallic scales 3. It is, therefore, a highly advantageous result for a solar collector designed in accordance with the invention that a tracking of lenses of radiation-focusing components regarding the respective altitude of the sun is not necessary in practical application, any losses through the back-scattering in the infrared range which increase with the fourth power of absolute temperature being kept at an absolute minimum.

Having described the invention, what is claimed as new and what is desired to secure by Letters Patent is:

1. A solar collector comprising in combination an absorber member, a substrate member and a lens member each being essentially planar and mounted, having the major dimension thereof parallel;

said lens member having a plurality of light-focusing shapes along said major dimension;

said substrate member having a light transmission control coating, said substrate member being positioned so that said coating is at the focal length of said light-focusing shapes of said lens member and said coating having deforming properties capable of permitting light transmission through said coating, said deforming properties being responsive to focused light.

2. A solar absorber comprising in combination:

a planar array of lenses;

an absorber material disposed in a plane essentially parallel to the plane of said array of lenses; and a radiation control member comprising a translucent sheet mounted essentially parallel to the plane of said array of lenses and having on the surface thereof adjacent to said absorber member a plurality of independent light transmission means responsive to focused light through said array of lenses, each said light transmission means having a reflective coating on the surface thereof adjacent to said absorber material.

* * * * *